(12) United States Patent
Ide

(10) Patent No.: US 7,800,336 B2
(45) Date of Patent: Sep. 21, 2010

(54) CONTROL SYSTEM FOR SYNCHRONOUS ELECTRIC MOTOR

(75) Inventor: Yuuji Ide, Ueda (JP)

(73) Assignee: Sanyo Denki Co., Ltd., Tokyo (JP)

(*) Notice: Subject to any disclaimer, the term of this patent is extended or adjusted under 35 U.S.C. 154(b) by 390 days.

(21) Appl. No.: 12/047,504

(22) Filed: Mar. 13, 2008

(65) Prior Publication Data
US 2008/0224645 A1 Sep. 18, 2008

(30) Foreign Application Priority Data
Mar. 14, 2007 (JP) ............... 2007-064381

(51) Int. Cl.
*H02P 1/46* (2006.01)
(52) U.S. Cl. .................. 318/700; 318/432; 318/434
(58) Field of Classification Search ............. 318/700, 318/432, 434, 727, 800
See application file for complete search history.

(56) References Cited

U.S. PATENT DOCUMENTS

| | | | | |
|---|---|---|---|---|
| 5,144,564 A * | 9/1992 | Naidu et al. | ............... | 318/721 |
| 6,281,656 B1 * | 8/2001 | Masaki et al. | ............... | 318/700 |
| 6,531,843 B2 * | 3/2003 | Iwaji et al. | ............... | 318/727 |
| 2002/0060548 A1 * | 5/2002 | Iwaji et al. | ............... | 318/727 |
| 2006/0125439 A1 * | 6/2006 | Ajima et al. | ............... | 318/716 |

FOREIGN PATENT DOCUMENTS

| | | |
|---|---|---|
| JP | 63-059783 | 3/1988 |
| JP | 02-241388 | 9/1990 |

* cited by examiner

*Primary Examiner*—Rina I Duda
(74) *Attorney, Agent, or Firm*—Rankin, Hill & Clark LLP

(57) ABSTRACT

A control system for a synchronous electric motor controls the synchronous motor so that the phase of a current determined based on a magnetic pole position of a moving element of the motor may shift to a phase where maximum torque may be obtained. A magnetic pole position correcting section determines a magnetic pole position correction to be added to a relative magnetic pole position. In connection with a polarity change determining section which determines whether or not a polarity of an acceleration difference changes, a basic correction adjusting section switches computation between an incremental operation of incrementing a basic correction and a decremental operation of decrementing the basic correction by a correction increment/decrement. When the correction increment/decrement becomes a predetermined lower limit value B or less, the basic correction adjusting section stops the computation. The basic correction at that point is determined as a finally-determined magnetic pole position correction.

7 Claims, 6 Drawing Sheets

CONTROL SYSTEM FOR SYNCHRONOUS ELECTRIC MOTOR

FIELD OF THE INVENTION

The present invention relates to a control system for a synchronous electric motor, which is capable of determining a magnetic pole position of a moving element where the maximum torque may be obtained at the time of starting a synchronous electric motor and controlling the synchronous electric motor thereafter.

BACKGROUND OF THE INVENTION

Japanese Patent Application Publication No. 63-59783 (JP63-59783A) (hereinafter referred to as Patent Document 1) discloses a method of performing drive control of a synchronous electric motor. The Patent Document 1 shows: before the synchronous motor is regularly driven, two-phase DC excitation is applied to the synchronous motor, thereby bringing a magnetic rotor into a standstill at a stable point; then, based on a count value of an incremental encoder at the stable point and a count value of the incremental encoder when the DC excitation is started, an encoder count value corresponding to an original point for a one-phase excitation is calculated; then, an electrical angle phase of the synchronous motor is determined from a difference between the encoder count value and the original point, and using the electrical angle phase, drive control of the synchronous motor is performed. In this conventional art, when the synchronous motor is subjected to an initial operation, it is necessary to bring the rotor into a standstill once at a mechanically stable point, and then to drive the synchronous motor. However, when the rotor is not located at the mechanically stable point, it is necessary to greatly move the rotor to the mechanically stable point. In such cases, the rotor has to be moved greatly, which is a problem. Then, in a control system for a synchronous electric motor disclosed in Japanese Patent Application Publication No. 02-241388 (JP02-241388A) (hereinafter referred to as Patent Document 2), an initial operation of a synchronous motor (determination of a phase angle at which the maximum torque may be obtained) is performed without rotating a rotor. Specifically, in the control system for a synchronous electric motor disclosed in Patent Document 2, torque is detected while changing the phase angle between a permanent magnet pole of the rotor and a rotational magnetic field formed by a stator. Then, a power factor when torque is zero is obtained. Further, a location shifted from the location where the torque is zero just by an electrical angle phase of 90° is defined as a reference point for a commutation angle command with the power factor of one, and an initial operation is performed using the commutation angle command.

In the control system for a synchronous electric motor disclosed in Patent Document 2, a rotor angle in a moving direction of the rotor, at which output torque of the motor finally becomes zero, is sequentially obtained. A magnetic pole position of the rotor is thereby detected. However, there is friction in an oil seal of the motor and a mechanical system connected to a shaft of the motor. Unless the torque generated by the motor becomes larger than the friction, the rotor will not move. For this reason, in the conventional control system for a synchronous motor, when the magnetic pole position of the rotor becomes close to a proper value and the torque generated by the motor becomes smaller than the friction torque, the rotor of the motor comes to a stop. The correct magnetic pole position of the rotor, where the maximum torque may be obtained, cannot be determined. An error is thereby produced in detection of the magnetic pole position. When there is an error in the detection of magnetic pole position of the rotor (moving element in the case of a linear motor), the phase of a current that flows through armature windings on the stator will be deviated from a phase where the maximum torque may be obtained. Thus, the torque generated by the motor during a regular operation will be reduced. Likewise, since weakened magnetic field compensation is performed based on the magnetic pole position, an amount of the weakened magnetic field compensation differs between forward rotation and reverse rotation of the motor, when there is an error in detection of the magnetic pole position. As a result, the torque generated by the motor may become different between the forward rotation and the reverse rotation of the motor.

SUMMARY OF THE INVENTION

An object of the present invention is accordingly to provide a control system for a synchronous electric motor, which is capable of shifting the phase of a current determined based on a magnetic pole position of a moving element substantially to a phase where the maximum torque may be generated.

A control system for a synchronous electric motor of the present invention basically includes a position detecting section, a torque command generating section, a current command generating section, a current supply section, and a current feedback section. A synchronous electric motor controlled by the control system includes a moving element having a plurality of moving element magnetic poles and a stator having a plurality of stator magnetic poles each polarized when a current is flown through armature winding. The synchronous electric motor may be a rotary synchronous electric motor wherein a moving element rotates, or a linear synchronous electric motor wherein a moving element moves linearly. It is a common practice to employ magnetic poles formed of permanent magnets or formed by using magnetic flux generated by the permanent magnets, as the moving element magnetic poles.

The position detecting section detects relative magnetic pole positions of the moving element magnetic poles relative to the stator magnetic poles and outputs a relative position detection signal indicating a relative magnetic pole position θm. As such position detecting section, an incremental encoder, which does not detect an absolute position of the moving element, may be used. The torque command generating section generates a torque command. As the torque command, a torque command that generates a sinusoidal wave signal of which the phase changes by 180° in a half cycle, may be employed. Then, the current command generating section generates a current command that determines a current flown through the armature winding based on the torque command. A current control device as the current supply section supplies the current to the armature winding based on the current command. The current feedback section detects the current flowing through the armature winding and generates a feedback current signal indicating the current. The current feedback section and the current control device are configured to determine a phase of the current, based on the relative magnetic pole position θm detected by the position detecting section.

The control system of the present invention also includes an acceleration computing section, an added torque generating section, an initial correction generating section, and a regular correction generating section. The acceleration computing section determines an acceleration of the moving element based on the relative magnetic pole position θm output from the position detecting section. The added torque generating section generates an added torque TADD which is added to the torque command and is necessary for allowing the moving element to overcome friction toque and thereby move. Specifically, the added torque generating section may be configured to generate the added torque (TADD=TADD+α: α herein is an increment) that gradually increases when an absolute value of the acceleration is smaller than a reference value and to generate the added torque (TADD=TADD×β: β herein is a coefficient) not less than the added torque which has been generated before the absolute value of the acceleration reaches the reference value, once the absolute value of the acceleration has reached the reference value. The reference value is herein defined so that, in view of a resolution of the encoder used in the position detecting section, the acceleration may be accurately detected. The reason why the added torque is added to the torque command as described above is to generate the minimum torque necessary for causing the moving element to move and performing accurate measurement when starting the motor.

The initial correction generating section generates, during an initial operation, a magnetic pole position correction $\theta c$ to be added to the relative magnetic pole position $\theta m$ so as to shift the phase of the current substantially to a phase where the maximum torque may be obtained, when the absolute value of the acceleration is smaller than the predetermined reference value. The magnetic pole position correction is used to correct the relative magnetic pole position $\theta m$ so as to quickly shift the phase of the current substantially to the phase where the maximum torque may be obtained. In the present invention, the initial correction generating section is configured to generate a magnetic pole position correction during the initial operation by adding 90° to and/or subtracting 90° from an initial value of a basic correction $\theta 1$. The initial correction generating section may be configured to alternately generate a magnetic pole position correction (the initial value of the basic correction $\theta 1+90°$) that shifts the moving element to a positive side and the magnetic pole position correction (the initial value of the basic correction $\theta 1-90°$) that shifts the moving element to a negative side, for example. Alternatively, depending on a moving direction of the moving element, the initial value of the basic correction $\theta 1-90°$ may be generated first, and the initial value of the basic correction $\theta 1+90°$ may be generated later. The reason for addition and/or subtraction of 90° as described above is as follows. When the absolute value of the acceleration is small, a little large torque is first generated to increase the acceleration. Then, the phase of the current flown through the armature winding is thereby allowed to quickly shift to the phase where the maximum torque may be obtained.

The regular correction generating section generates, during the regular operation, the magnetic pole position correction $\theta c$ to be added to the relative magnetic pole position $\theta m$ so as to shift the phase of the current substantially to the phase where the maximum torque may be obtained, when the absolute value of the acceleration is equal to or larger than the predetermined value. The regular correction generating section includes a basic correction determining section for determining the basic correction $\theta 1$ that is the basis of the magnetic pole position correction $\theta c$ during the regular operation; and an offset determining section for determining an offset $\theta OFS$ to be alternately added to or subtracted from the basic correction $\theta 1$. The magnetic pole position correction $\theta c$ is obtained by adding the offset $\theta OFS$ to the basic correction $\theta 1$. In other words, the computation expression of $\theta c=\theta 1+\theta OFS$ is employed. Since a polarity of the offset $\theta OFS$ alternately changes, the magnetic pole position correction $\theta c$ changes, alternately increasing and decreasing. Then, the basic correction $\theta 1$ finally becomes constant. Thus, the magnetic pole position correction $\theta c$ assumes a value that alternately increases and decreases by the fixed offset $\theta OFS$ with respect to the basic correction $\theta 1$.

The basic correction determining section includes a basic correction adjusting section, an acceleration difference computing section, and a polarity change determining section. The basic correction adjusting section performs an incremental operation or a decremental operation of the basic correction $\theta 1$, namely, increments or decrements the basic correction $\theta 1$ whenever the acceleration is detected. The acceleration difference computing section computes an acceleration difference between the acceleration previously detected and the acceleration currently detected. The polarity change determining section determines a change in polarity for the acceleration difference computed by the acceleration difference computing section. Here, a positive polarity of the acceleration difference is marked by "+" and a negative polarity of the acceleration difference is marked by "−". Then, when there is no polarity change, polarities of the acceleration difference are marked by "+, +" or "−, −". When the polarity change occurs, the polarities of the acceleration difference are marked by "+, −" or "−, +".

The basic correction adjusting section performs an incremental operation of incrementing the basic correction $\theta 1$ by a predetermined correction increment/decrement KX or a decremental operation of decrementing the basic correction $\theta 1$ by the correction increment/decrement KX according to the polarities of the acceleration difference before the polarity change determining section determines the polarity change. The basic correction adjusting section stepwisely or gradually decreases the correction increment/decrement KX and switches between the incremental operation and the decremental operation whenever the polarity change determining section determines a change in polarity. In other words, the basic correction adjusting section switches the incremental operation to the decremental operation when the basic correction adjusting section performs the incremental operation before the polarity change determining section determines the polarity change. The basic correction adjusting section switches the decremental operation to the incremental operation when the basic correction adjusting section performs the decremental operation before the polarity change determining section determines the polarity change. Further, the basic correction adjusting section stops computation at a point of time when the correction increment/decrement KX becomes a predetermined lower limit value B or less and defines the basic correction $\theta 1$ obtained at the point as the finally-determined magnetic pole position correction $\theta c$. When the basic correction adjusting section is configured as described above, the basic correction $\theta 1$ approaches the magnetic pole position correction $\theta c$ which is added to the relative magnetic position $\theta m$ during the final control operation in order to gradually shift the phase of the current substantially to the phase where the maximum torque may be obtained During the process for obtaining the maximum torque, the basic correction $\theta 1$ converges through the incremental and decremental operations using the correction increment/decrement KX. Then, the converged basic correction $\theta 1$ is set to the finally-determined magnetic position correction. Accordingly, this finally-determined magnetic pole position correction is used as the magnetic pole position correction to be added to the relative magnetic position $\theta m$ in subsequent control over the synchronous electric motor. Thus, according to the present invention, without greatly moving the moving element, a phase ($\theta m+\theta c$) of the current determined based on the magnetic pole position of the moving element may be corrected or shifted to the phase where the maximum torque may be generated.

Specifically, the basic correction adjusting section may be configured to decrease the correction increment/decrement by a factor of 1/n (n is a positive integer not less than two), for example, whenever the polarity change determining section determines the polarity change. When the value of n is too large, it takes much time for the basic correction θ1 to converge. Thus, the value of n should not be set so large.

Preferably, the offset determining section may be configured to increase an offset amount Δθ of the offset θOFS when the correction increment/decrement KX becomes smaller than a predetermined value. This is because, when the correction increment/decrement KX is large and the offset amount Δθ is too large, the convergence is delayed. More specifically, it is preferred that the offset determining section may be configured to increase the offset amount Δθ 1.5 times the offset amount Δθ initially defined when the correction increment/decrement KX becomes smaller than the predetermined value.

Taking the converged basic correction θ1 as the finally-determined magnetic pole correction θc, the current feedback section and the current control device determine the phase of the current, based on the value (θm+θc), obtained by adding the finally-determined magnetic pole position correction θc to the relative magnetic pole position θm output from the position detecting section.

According to the present invention, in a situation where there is friction, the phase of the current determined based on the magnetic pole position of the moving element may be corrected or shifted to the phase where the maximum torque may be generated at high accuracy.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

DETAILED DESCRIPTION OF PREFERRED EMBODIMENT

Figure 1:
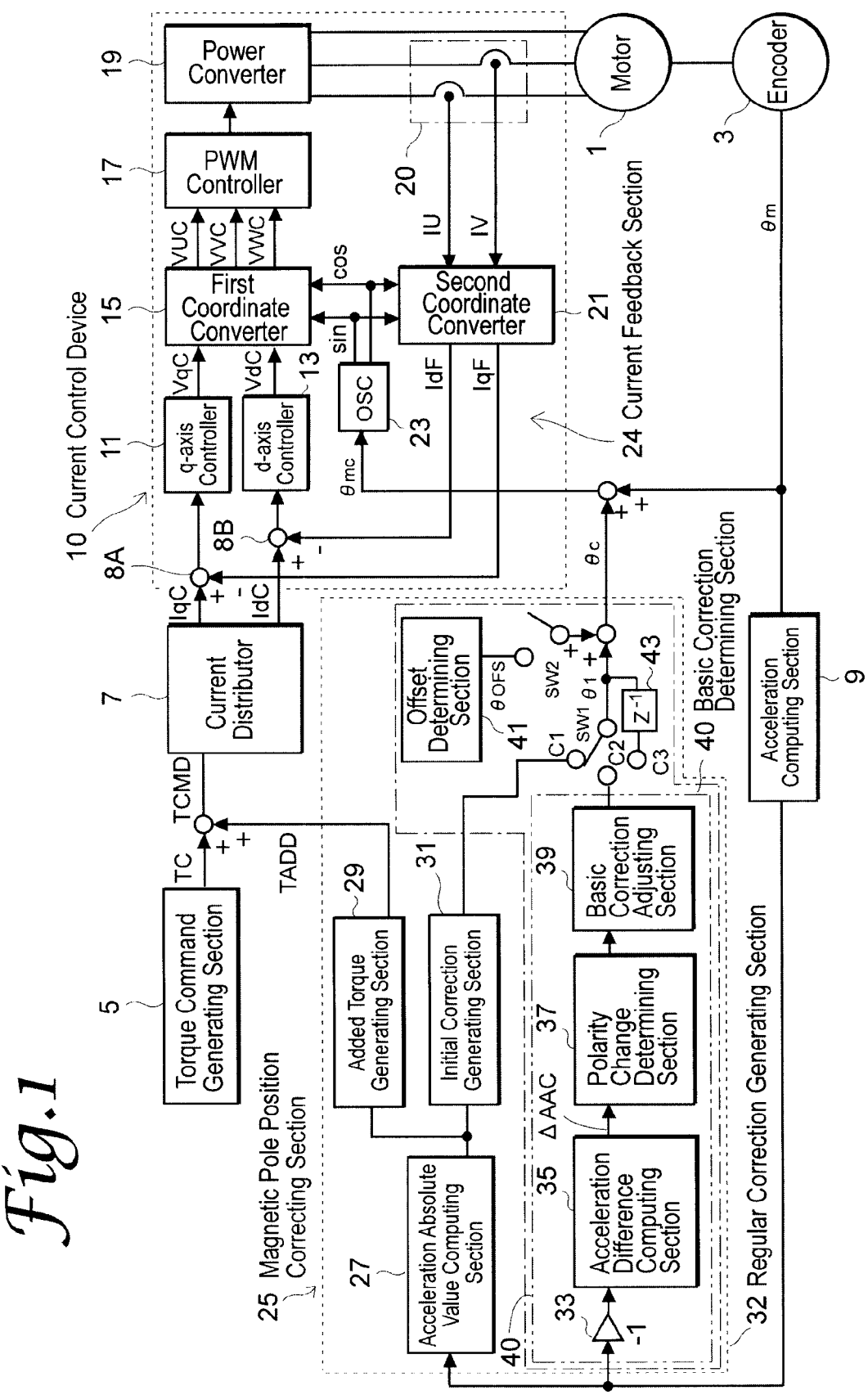
FIG. 1 is a block diagram showing an example configuration of a control system for a synchronous electric motor in an embodiment of the present invention.

Now, an embodiment of the present invention will be described below in detail with reference to the accompanying drawings. FIG. 1 is a block diagram showing an example configuration of a control system for a synchronous electric motor according to the embodiment of the present invention.

A synchronous motor 1 includes a rotor and a stator. The rotor includes a rotor core and a plurality of permanent magnets which are fixed to a surface of the rotor core to thereby form a plurality of rotor magnetic poles (moving element magnetic poles). The stator includes a plurality of stator magnetic poles formed by winding three-phase armature windings around a stator core. In other words, this synchronous motor 1 is a surface permanent magnet synchronous motor which has permanent magnets on the surface of rotor core. Incidentally, the control system for a synchronous electric motor of the present invention may be of course applied to synchronous motors of other types such as an interior permanent magnet (IPM) synchronous motor which has permanent magnets embedded in a rotor core.

A rotor magnetic pole position of the rotor of the synchronous motor 1 is detected by an incremental encoder 3 that outputs a plurality of pulses per revolution and detects a rotor magnetic position θ based on the pulses. In this embodiment, the incremental encoder 3 is used as a position detecting section for detecting a relative position of the rotor (moving element) of the synchronous motor 1 with respect to the stator and outputting a relative magnetic pole position detection signal indicating a relative position θm of the rotor.

Figure 2:
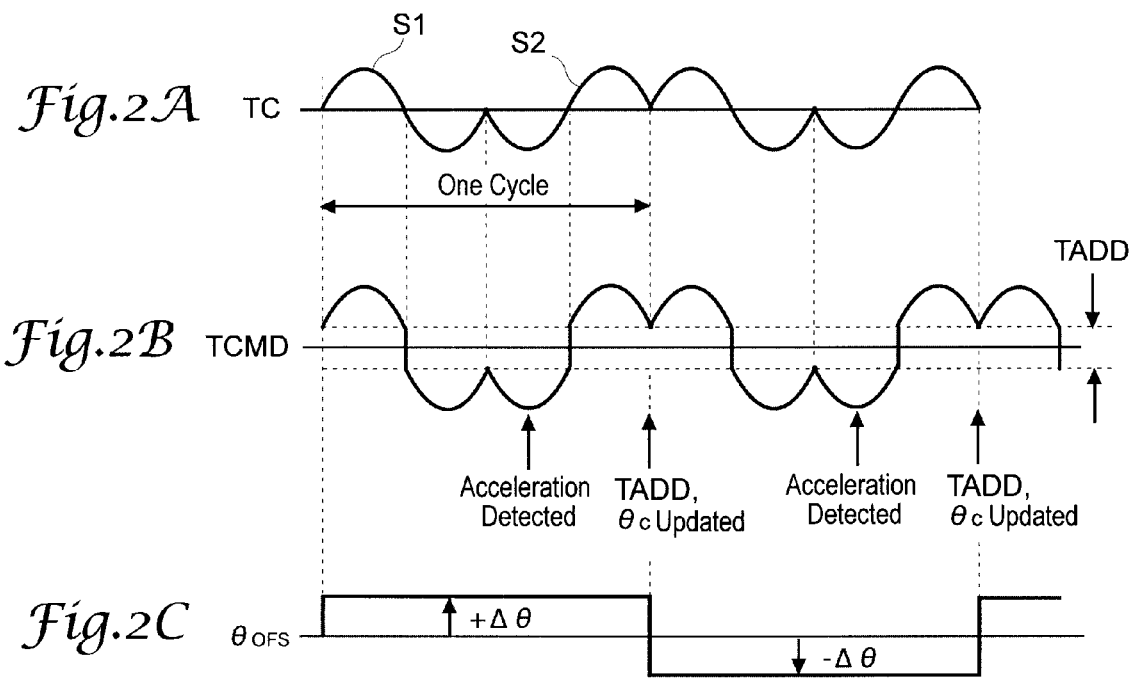
FIGS. 2A through 2C are diagrams showing a relationship among a torque command signal, a torque command signal added with an added torque, and an offset amount used in the embodiment in FIG. 1.

The control system for a synchronous electric motor in this embodiment includes a torque command generating section 5, a current distributor 7, an acceleration computing section 9, a q-axis controller 11, a d-axis controller 13, a first coordinate converter 15, a PWM controller 17, a power converter 19, a second coordinate converter 21, a signal oscillator 23, and a magnetic pole position correcting section 25. In this embodiment, the current distributor 7 works as a current command generating section. Then, the q-axis controller 11, d-axis controller 13, first coordinate converter 15, PWM controller 17, power converter 19, current detecting section 20, second coordinate converter 21, and signal oscillator 23 constitute a current control device 10. The current detecting section 20, second coordinate converter 21, and signal oscillator 23 constitute a current feedback section 24. As shown in FIG. 2A, the torque command generating section 5 used in this embodiment generates a torque command signal TC having two sinusoidal waves S1 and S2 of different phases during one cycle. The torque command signal TC indicates a torque command TC. One sinusoidal wave S1 generated during a first half of the cycle and one sinusoidal wave S2 generated during a latter half of the cycle are 180 degrees different in phase. Such a peculiar torque command signal is employed to cause the rotor of the motor to scarcely move when torque is applied to the motor. Then, in this embodiment, as shown in FIG. 2B, an added torque TADD output from an added torque generating section 29 of the magnetic pole position correcting section 25, which will be described later in detail, is added to the torque command signal TC generated by the torque command generating section 5. A torque command signal TCMD obtained by adding the added torque TADD is input to the current distributor 7. The current distributor 7 internally outputs a current command, based on the torque command signal TCMD indicating a torque command TCMD. Then, using a magnetomotive force phase difference angle φ defined as an angle between a current command IC internally generated and a d axis, the current distributor 7 distributes or splits the current command IC into a q-axis current command IqC and a d-axis current command IdC and outputs the resulting commands. The q-axis controller 11 outputs a q-axis voltage command VqC, based on a difference between the q-axis current command IqC and a q-axis current feedback signal IqF, the difference being obtained by a subtractor 8A. The d-axis controller 13 outputs a d-axis voltage command VdC, based on a difference between the d-axis current command IdC and a d-axis current feedback signal IdF, the difference being obtained by a subtractor 8B. The first coordinate converter 15 receives the d-axis voltage command VdC and the q-axis voltage command VqC and performs coordinate conversion, and outputs three-phase voltage commands VUC, VVC, and VWC to the PWM controller 17. Then, the signal oscillator 23 outputs a sin θ signal and a cos θ signal to each of the first coordinate converter 15 and the second coordinate converter 21, based on the rotor magnetic pole position θm output from the encoder 3. The d-axis current feedback signal IdF and the q-axis current feedback signal IqF are output from the second coordinate converter 21. The second coordinate converter 21 outputs the d-axis current feedback signal IdF and the q-axis current feedback signal IqF, using output currents from the power converter 19, detected by the current detecting section 20 and the sin θ and cos θ signals output from the signal oscillator 23 as input signals. The signal oscillator 23 generates the sin θ and cos θ signals to each of the first coordinate converter 15 and the second coordinate converter 21, based on an added value θ(=θm+θc) of the rotor magnetic pole position θm detected by the encoder 3 and a magnetic pole position correction θc output from the magnetic pole position correcting section 25, which will be described later. Based on these sin θ and cos θ signals, the first coordinate converter 15 and the second coordinate converter 21 perform coordinate conversion, thereby controlling a current that flows through the motor 1.

The magnetic pole correcting section 25 includes an acceleration absolute value computing section 27, the added torque generating section 29, an initial correction generating section 31, an inverter circuit 33, an acceleration difference computing section 35, a polarity change determining section 37, a basic correction adjusting section 39, an offset determining section 41, a storage section 43, a first switching section SW1, and a second switching section SW2. In this embodiment, the inverter circuit 33, acceleration difference computing section 35, polarity change determining section 37, basic correction adjusting section 39, offset determining section 41, storage section 43, first switching section SW1, and second switching section SW2 constitute a regular correction generating section 32. In the magnetic pole position correcting section 25, acceleration is detected at timings shown in FIG. 2B, the magnetic pole position correction θc is computed, and the added torque TADD is also computed.

Figure 3:
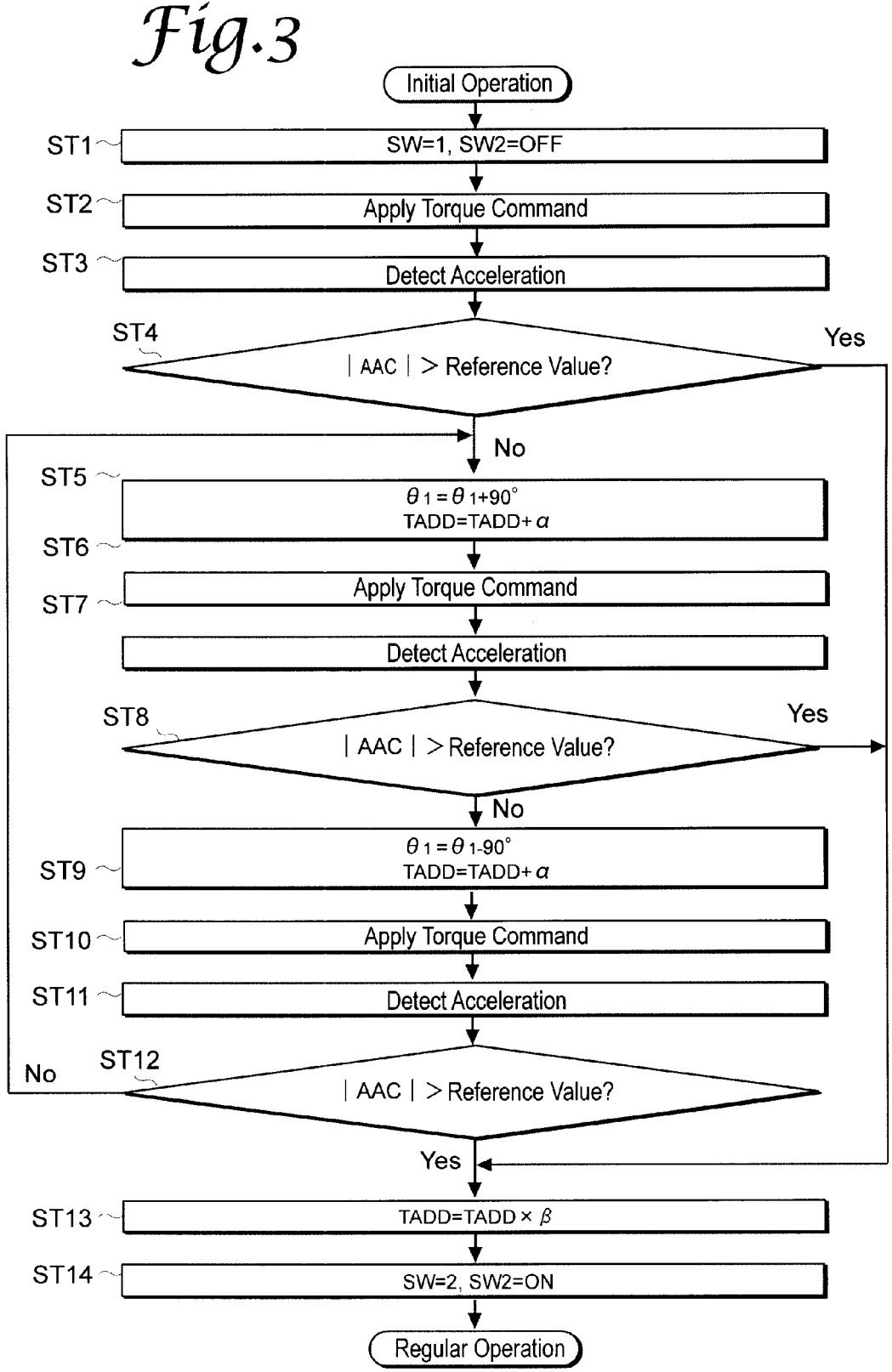
FIG. 3 is a flowchart showing an algorithm for an initial operation, which is part of the software used in implementing a magnetic position correcting section using a computer.
Figure 4:
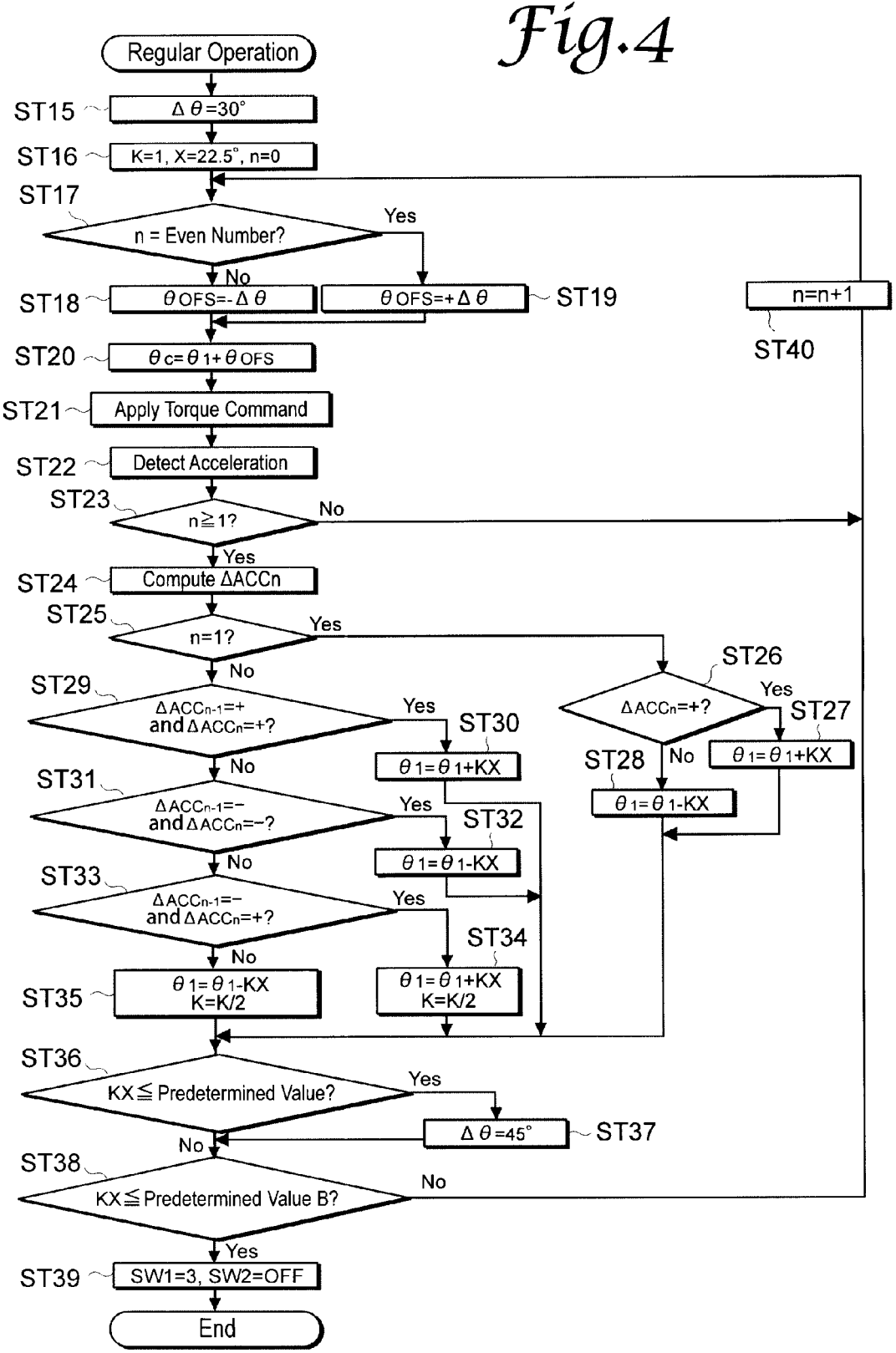
FIG. 4 is a flowchart showing an algorithm for a regular operation, which is part of the software used in implementing the magnetic position correcting section using the computer.
Figure 5:
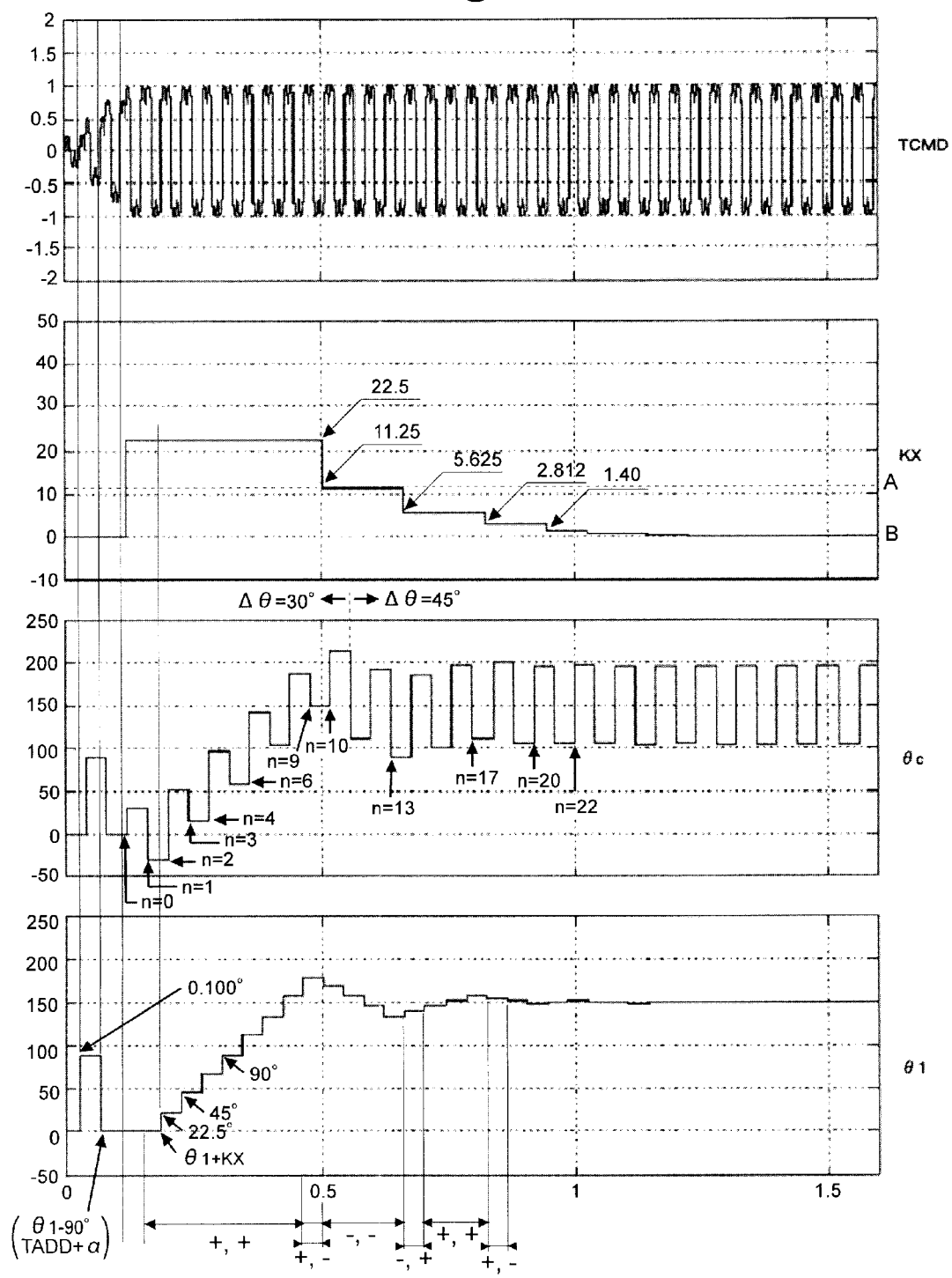
FIG. 5 illustrates waveform diagrams used for explaining an operation of the control system according to the embodiment shown in FIG. 1.

FIGS. 3 and 4 respectively show an initial operation algorithm and a regular operation algorithm of the software used in implementing the magnetic pole position correcting section 25 using a computer. FIG. 5 shows an example of operation waveforms when the embodiment shown in FIG. 1 is operated according to the algorithms shown in FIGS. 3 and 4. In the following description, an operation of the magnetic pole position correcting section 25 in FIG. 1 will be described with reference to FIGS. 3 through 5. In the initial operation algorithm shown in FIG. 3, a part of the acceleration absolute value computing section 27, added torque generating section 29, initial correction generating section 31, first switching section SW1, and second switching section SW2 in FIG. 1 are implemented.

In an initial state, the first switching section SW1 selects a contact C1, and the second switching section SW2 becomes an OFF state (or a disconnected state), in step ST1 in FIG. 3. Then, in step ST2, the torque command TCMD is output via the torque command generating section 5. This command causes the rotor to move via the current distributor 7, subtractors 8A and 8B, and current control device 10. A position of the rotor is detected by the encoder 3, and an output of the encoder 3 is input to the acceleration absolute value computing section 27 via the acceleration computing section 9. In step ST3, the acceleration absolute value computing section 27 computes an absolute value of an acceleration ACC or an acceleration magnitude of the rotor based on the relative position detection signal indicating the relative magnetic pole position θm output from the encoder 3 that works as the position detecting section (in step ST3).

Then, the added torque generating section 29 generates the added torque TADD which is added to the torque command TC and is necessary for the rotor to overcome friction torque and thereby move. When the absolute value of the acceleration ACC output by the acceleration absolute value computing section 27 is smaller than a predetermined reference value (a predetermined value), the added torque generating section 29 generates the added torque that increases gradually (or stepwise) (in steps ST4 and ST5, and steps ST8 and ST9). The added torque TADD that gradually increases may be herein computed as the added torque TADD=TADD+α (in which α indicates an increment), for example. The added torque TADD is added to the torque command TC, and the resulting torque command TCMD is input to the current distributor 7 (in steps ST6 and ST10). FIG. 2B shows a waveform after the added torque TADD has been added to the torque command TC. An uppermost waveform in FIG. 5 shows a waveform change of the torque command TCMD after the addition. As seen from an initial stage of the waveform TCMD in FIG. 5, an amplitude peak of the torque command TCMD after the addition gradually increases. In other words, the amplitude of the torque command TCMD to be input to the current distributor 7 gradually increases. As a result, the current commands gradually increase.

Then, when the absolute value of the acceleration ACC has reached the reference value (or when the absolute value of the acceleration ACC has become the reference value or more), the added torque generating section 29 generates an added torque (TADD=TADD×β: wherein β is a coefficient) not less than the added torque before the absolute value of the acceleration has reached the reference value (in step ST13 in FIG. 3). Since the added torque (TADD=TADD×β) is constant, the amplitude peak of the torque command TCMD after the addition becomes constant, as seen from the waveform of the torque command TCMD after the addition in FIG. 5. The reference value (predetermined value) is herein determined so that, in view of a resolution of the encoder 3, the acceleration may be accurately detected. The increment α is determined so that the initial operation may be completed at an appropriate speed and at the same time the amplitude of the torque command may not become too large. The coefficient β is determined so that torque generated by the motor does not become smaller than the friction torque even if an offset θOFS is added. As described above, when the added torque TADD is added to the torque command TC, the rotor of the synchronous motor 1 is moved, and then the minimum torque necessary for performing accurate torque measurement may be generated. A moving amount of the rotor of the synchronous motor 1 may be thereby reduced.

The acceleration ACC output from the acceleration absolute value computing section 27 is input to the initial correction generating section 31 in synchronization with the above operation. When the absolute value of the acceleration ACC is smaller than the predetermined reference value (in steps ST4 and ST8 in FIG. 3), the initial correction generating section 31 generates, during the initial operation, the magnetic pole position correction θc (=θ1) to be added to the relative magnetic pole position θm indicated by the relative magnetic pole position detection signal, in order to shift a phase of the current to be provided to an armature of the motor substantially to a phase where the maximum torque may be obtained. The initial correction θc is employed to shift the phase of the three-phase current substantially to the phase where the maximum torque may be obtained. In this embodiment, the initial correction generating section 31 generates, during the initial operation, a predetermined magnetic pole position correction (an initial value θ1+90°) and/or a predetermined magnetic pole position correction (initial value θ1−90°) as the magnetic pole position correction θc. The initial value θ1 is herein a basic correction that forms the basis of correction. A change in the basic correction θ1 is shown in a lowermost portion of FIG. 5. In the example in FIG. 5, an initial value of the basic correction θ1 is set to 0°. The initial value of the basic correction θ1, however, may be set to an arbitrary value. Fixed quantities (of +90° or −90°) in the predetermined magnetic position correction are defined as necessary for changing the magnetic pole position correction θc and thereby helping the rotor overcome the friction torque and start moving.

Referring to a flowchart in FIG. 3, when the absolute value of the acceleration is smaller than the reference value (in steps ST4 and ST5), the magnetic pole position correction (θ1+90°) is at first output as the magnetic pole position correction θc. Then, a magnitude of the acceleration is detected (in step ST7). When the absolute value of the acceleration is still smaller than the reference value (in step ST8), the magnetic pole position correction (θ1−90°) is output as the magnetic pole position correction θc (in step ST9). Then, a magnitude of the acceleration is detected (in step ST11). When an absolute value of the acceleration is smaller than the reference value, an operation returns to step ST5 again and continues varying the magnetic pole position correction (or a swinging operation of the rotor). As seen from waveforms of the magnetic pole position correction θc and the basic correction θ1 shown in FIG. 5, after the initial correction generating section 31 has output a signal indicating the magnetic pole position correction (θ1+90°), the initial correction generating section 31 outputs a signal indicating the magnetic pole position correction (θ1−90°), during the initial operation. In the example in FIG. 5, after the initial operation, the operation proceeds to a regular operation, which will be described later. In other words, it is detected that an absolute value of the acceleration becomes larger than the reference value (in step ST12), and the operation proceeds to step ST13. Then, in step ST14, the first switching section SW1 selects a contact C2, and the second switching section SW2 is turned ON. A command for this switching is generated inside the initial correction generating section 31 when it is determined that the absolute value of the acceleration has become larger than the reference value. Inside the initial correction generating section 31, a comparing section for comparing an absolute value of the acceleration with the reference value, a correction computing section for computing the magnetic pole position correction θc (=θ1), and a switching command generating section for generating the command for switching are implemented by software.

As described above, after the friction torque has been overcome during the initial operation and the acceleration of the rotor has been thereby increased, the initial operation described in the flowchart in FIG. 3 proceeds to a regular operation described in a flowchart in FIG. 4. The regular operation is executed by the regular correction generating section 32 in FIG. 1. When an absolute value of the acceleration has become the predetermined reference value or more, the regular correction generating section 32 generates, during a regular operation, the magnetic pole position correction θc to be added to the relative magnetic pole position θm detected by the encoder 3, in order to shift the phase of the current substantially to the phase where the maximum torque may be obtained. The regular correction generating section 32 is constituted from a basic correction determining section 40 that determines the basic correction θ1 which forms the basis of the magnetic pole position correction θc during the regular operation and the offset determining section 41 that determines the offset (θOFS=Δθ) to be alternately added to or subtracted from the basic correction θ1. The basic correction determining section is constituted from the inverter circuit 33, acceleration difference computing section 35, polarity change determining section 37, and basic correction adjusting section 39.

The inverter circuit 33 inverts (a polarity of) the acceleration output by the acceleration computing section 9. The inverter circuit 33 is installed in order to correct a negative acceleration detection value. The acceleration difference computing section 35 computes an acceleration difference ΔACC between an immediately preceding acceleration and a current acceleration. The polarity change determining section 37 determines a polarity change of the acceleration difference ΔACC computed by the acceleration difference computing section 35. Then, whenever acceleration detection is performed, the basic correction adjusting section 39 increments or decrements the basic correction θ1.

In this embodiment, a positive polarity of the acceleration difference ΔACC is marked by "+", while a negative polarity of the acceleration difference ΔACC is marked by "−". Thus, when there is no polarity change of the acceleration difference ΔACC determined by the polarity change determining section 37, polarities of an immediately preceding acceleration difference ΔACCn−1 and a current acceleration difference ΔACCn are marked by "+, +" or "−, −". When the polarity change has occurred, the polarities of the immediately preceding acceleration difference ΔACCn−1 and the current acceleration difference ΔACCn are marked by "+, −" or "−, +". Below the basic correction θ1 in the lowermost portion of FIG. 5, polarity change states of the immediately preceding acceleration difference ΔACCn−1 and the current acceleration difference ΔACCn are shown. The polarities "+, +" or "−, −" of the immediately preceding acceleration difference ΔACCn−1 and the current acceleration difference ΔACCn mean that the basic correction θ1 is being shifted toward the magnetic pole position correction θc by which the maximum torque may be obtained. The polarities "+, −" or "−, +" of the immediately preceding acceleration difference ΔACCn−1 and the current acceleration difference ΔACCn mean that the basic correction θ1 is in the vicinity of the magnetic pole position correction θc by which the maximum torque may be obtained. Then, the basic correction θ1 at a point of time when the immediately preceding acceleration difference θACCn−1 and the current acceleration difference ΔACCn are substantially the same, is the magnetic pole position correction θc by which the maximum torque may be obtained.

The basic correction adjusting section 39 executes an incremental operation of incrementing the basic correction θ1 by a predetermined correction increment/decrement KX or a decremental operation of decrementing the basic correction θ1 by the predetermined correction increment/decrement KX according to polarities of an acceleration difference until the polarity change determining section 37 determines a polarity change. The initial value of the basic correction θ1 indicates the magnetic position correction determined during the initial operation. In the example in FIG. 5, the initial value of the basic correction θ1 is set to zero.

Then, the basic correction adjusting section 39 reduces the correction increment/decrement KX stepwisely or gradually and also performs switching between the incremental operation and the decremental operation of the basic correction whenever the polarity change determination section 37 determines a polarity change. To be more specific, when the basic correction adjusting section 39 performs the incremental operation before the polarity change determining section 37 determines a polarity change, the basic correction adjusting section 39 switches the incremental operation to the decremental operation. When the basic correction adjusting section 39 performs the decremental operation before the polarity change determining section 37 determines a polarity change, the basic correction adjusting section 39 switches the decremental operation to the incremental operation. In this embodiment, the basic correction adjusting section 39 is so configured that the correction increment/decrement is reduced to 1/n (n is a positive integer: n=2 in this embodiment) whenever the polarity change determining section 37 determines a polarity change. When the correction increment/decrement KX has become a predetermined lower limit value B or less, the basic correction adjusting section 39 stops the incremental or decremental operation. The basic correction $\theta 1$ determined at that point is set to the finally-determined basic correction.

Since the second switching section SW2 is ON during the regular operation, the offset $\theta$OFS (indicated by an offset amount $\Delta\theta$) output from the offset determining section 41 is alternately added to or subtracted from the basic correction $\theta 1$ output from the basic correction adjusting section 39. In other words, the magnetic pole position correction $\theta c$ is given by an expression of $\theta c=\theta 1\pm\Delta\theta$. The offset determining section 41 is configured to increase the offset amount $\Delta\theta$ when the correction increment/decrement KX becomes smaller than a predetermined value. If the offset amount $\Delta\theta$ is too large when the correction increment/decrement KX is large, convergence of the basic correction $\theta 1$ is delayed. When the correction increment/decrement KX becomes smaller than the predetermined value, the offset determining section 41 used in this embodiment increases the offset $\Delta\theta$ 1.5 times that used during the initial operation.

When the basic correction adjusting section 39 and the offset determining section 41 are constituted as described above, the basic correction $\theta 1$ approaches the finally-determined magnetic pole position correction $\theta c$, which should be added to the relative magnetic pole position $\theta m$ in order to gradually shift the phase of the three-phase current substantially to the phase where the maximum torque may be obtained. During the process for obtaining the maximum torque, the basic correction $\theta 1$ converges toward the finally-determined magnetic pole position correction $\theta c$ through the incremental and decremental operations using the correction increment/decrement KX. Then, the converged basic correction $\theta 1$ is set to the finally-determined magnetic position correction $\theta c$. With this arrangement, without greatly moving the rotor (moving element), the phase ($\theta m+\theta c$) of the current determined based on the magnetic pole position of the rotor (moving element) may be corrected or shifted to the phase where the maximum torque may be generated.

To be specific with reference to FIG. 4, during the regular operation, the second switching section SW2 is ON. Accordingly, the offset amount $\Delta\theta$ of the offset $\theta$OFS output from the offset determining section 41 is alternately added to and subtracted from the basic correction $\theta 1$ output from the basic correction adjusting section 39. In other words, the magnetic pole position correction $\theta c$ is given by an expression of $\theta c=\theta 1\pm\Delta\theta$. This incremental/decremental operation will be described using the flowchart in FIG. 4. In this embodiment, when the regular operation is started, the offset amount $\Delta\theta$ of offset $\theta$OFS of 30° is determined by the offset determining section 41 in step ST15. Then, in step ST16, values of a coefficient K and an angle increment/decrement X that determine the correction increment/decrement KX, which will be described later, are determined. In this embodiment, a value of the coefficient K is set to one, while a value of the angle increment/decrement X is set to 22.5°. The values of the coefficient K and the angle increment/decrement X may be set as necessary according to the type and characteristics of a synchronous motor to be controlled. A number n in step ST16 denotes the number of times the acceleration difference computing section 35 outputs an acceleration difference. When the number n is zero, no acceleration difference is detected yet. In an initial stage of the regular operation, it is determined whether the number n is an even number (including zero) or not in step ST17 in FIG. 4. Then, when it is determined that the number n is the even number, the offset determining section 41 determines the offset $\theta$OFS to be $+\Delta\theta$ (in step ST19). When it is determined that the n is an odd number, the offset determining section 41 determines the offset $\theta$OFS to be $-\Delta\theta$ (in step ST18). Then, in step ST20, the magnetic pole position correction $\theta c$ given by an expression of $\theta c=\theta 1+\theta$OFS is computed. In this embodiment, as seen from a waveform of the basic correction $\theta 1$ in FIG. 5, the basic correction $\theta 1$ is 0° when the number n is zero. Thus, the magnetic pole position correction $\theta c$ is obtained by an expression of $\theta c=\theta 1+\theta$OFS, which is 0°+30°=30°. Thus, the magnetic pole position correction $\theta c$ of 30° is obtained (refer to an angle at a waveform of the magnetic pole position correction $\theta c$ in FIG. 5 when the number n is zero). Then, the torque command is applied in step ST21, and a first acceleration is detected in step ST22. Next, it is determined whether the number n is equal to or more than one in step ST23. When the number n is zero, the operation proceeds to step ST40, and the number n is incremented by one. Then, the operation returns to step ST17 again.

When the operation returns to step ST17, the number n becomes one, which is the odd number. Then, the operation proceeds to step ST18. In step ST18, the offset $\theta$OFS is determined to be $-\Delta\theta$. Then, the magnetic pole position correction $\theta c$ is given by an expression of $\theta c=\theta 1+\theta$OFS, which is 0°−30°=−30°. Thus, the magnetic pole position correction $\theta c$ of −30° is obtained (refer to an angle at the waveform of the magnetic pole position correction $\theta c$ in FIG. 5 when the number n is one). Then, the operation proceeds to steps ST21 through ST23. In step ST23, the number n is determined to be one or more. The operation then proceeds to step ST24. The steps described so far in the regular operation implement a part of the basic correction determining section 40 and the offset determining section 41.

When the number n is determined to be one or more in step ST23 and the operation proceeds to step ST24, the acceleration difference $\Delta$ACCn is computed. In this embodiment, step ST24 implements the acceleration difference computing section 35. Next, in step ST25, it is determined whether the number n is equal to one or not. When the number n is determined to be one, the operation proceeds to step ST 26. In step ST26, it is determined whether a polarity of the acceleration difference $\Delta$ACCn is "+" or "−". When the polarity of the acceleration difference $\Delta$ACCn is "+", the operation proceeds to step ST27. When the polarity of the acceleration difference $\Delta$ACCn is "−", the operation proceeds to step ST28. In step ST27, the basic correction $\theta 1$ is computed as ($\theta 1+$KX), and in step ST28, the basic correction $\theta 1$ is computed as ($\theta 1-$KX), in which KX indicates the correction increment/decrement. Computation of the basic correction θ1 using this correction increment/decrement is executed by the basic correction adjusting section 39 in FIG. 1. In the example of the operation waveforms shown in FIG. 5, the acceleration difference ΔACC1 is "+". Accordingly, the basic correction θ1 is computed in step ST27. Specifically, since the basic correction θ1 at first is zero, the basic correction θ1 in step ST27 is computed to be θ+KX=22.5°. Referring to FIG. 5, in the waveform of the basic correction θ1, an increase of 22.5° is seen after n=1.

Next, the operation proceeds to step ST36, and it is determined whether a value of the correction increment/decrement KX is a predetermined value A (12.5° in this embodiment) or less. In a stage where n=1, the correction increment/decrement KX is 22.5°. Thus, the operation proceeds to step ST38. In step ST38, it is determined whether the value of the correction increment/decrement KX is a predetermined value B (10 in this embodiment) or less. In the stage where n=1, the correction increment/decrement KX is 22.5°. Thus, the operation proceeds to step ST40, and n is incremented by one to become two. Thus, the operation proceeds to step ST17.

Next, when n=2, the offset amount Δθ becomes +30° in step ST19. In step ST20, the magnetic pole position correction θc becomes 22.5°+30°=52.5° (refer to an angle at the waveform of the magnetic pole position correction θc in FIG. 5 at a position where n=2). Then, in step ST24, the acceleration difference ΔACC2 is computed. In the example in FIG. 5, the polarity of acceleration difference at this point is also "+". The operation then proceeds from step ST25 to step ST 29, and the polarities of the acceleration differences are determined in step ST29. In step ST29, the polarities of the immediately preceding acceleration difference and the current acceleration difference are determined. In this embodiment, the polarities of the immediately preceding acceleration difference and the current acceleration difference become "+, +". As a result, the operation proceeds to step ST30. Then, in step ST 30, computation of the basic correction θ1 is done by the expression θ1=θ1+KX. Specifically, a computation result of θ1=22.5°+22.5°(=KX)=45° is obtained. It means that when n=2, the basic correction θ1 becomes 45°. Then, the operation proceeds to steps ST36, ST38, and ST40. In step ST40, the number n is incremented by one to become three. Then, the operation returns to step ST17.

Figure 6:
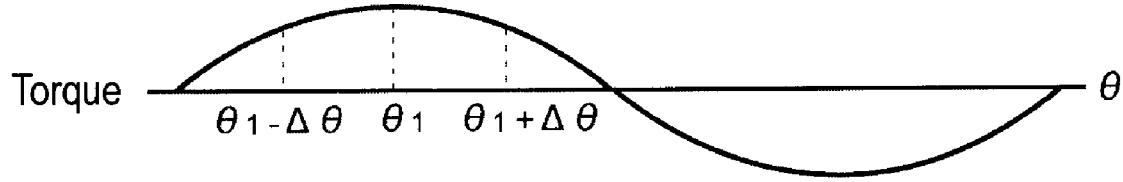
FIG. 6 is a diagram showing a relationship between a basic correction and torque.

Next, the operation proceeds to step ST18 from step ST17. The offset θOFS becomes −30°. Accordingly, the magnetic pole position correction θc, which is computed in step ST20, becomes 52.5°−30°=22.5° (refer to an angle at the waveform of the magnetic pole position correction θc in FIG. 5 at a position where n=3). Then, the acceleration difference ΔACC3 is computed in step ST24. The polarity of the acceleration difference at this point is also assumed to be "+". Accordingly, the operation proceeds from step ST29 to step ST 30, and the basic correction θ1 becomes 45°+22.5°=67.5°. Then, the operation proceeds to step 40 via steps ST36 and ST 38, and the number n is incremented by one to become four. Then, the operation returns to step ST 17, and a value of the basic correction θ1 continues increasing until the polarity of the acceleration difference ΔACC becomes "−". With an increase in the basic correction θ1, the magnetic pole position correction θc also increases while alternately increasing or decreasing. Here, the increase in the basic correction θ1 means that the magnetic pole position correction θc approaches a value to be added to the relative magnetic pole position θm in order to shift the phase of the three-phase current substantially to the phase where the maximum torque may be obtained. In a final stage, for example, as shown in FIG. 6, the magnetic pole position correction θc varies just by the offset amount Δθ of the offset θOFS, centering on the converged basic correction θ1. The converged basic correction θ1 is then used as the finally-determined magnetic pole position correction.

When the number n increases and the magnetic pole position correction θc exceeds the converged basic correction θ1 (finally-determined magnetic pole position correction) during a process where the respective steps in FIG. 4 are continuously executed, the polarity of the immediately preceding acceleration difference ΔACCn−1 becomes different from the polarity of the current acceleration difference ΔACCn. The polarity change is determined in step ST33. When the polarity of the current acceleration difference has changed from "+" to "−", the operation proceeds to step ST35. When the polarity of the current acceleration difference has changed from "−" to "+", the operation proceeds to step ST34. In step 35, with the coefficient K taken as K/2, the basic correction θ1=θ1−KX is computed. In step 34, with the coefficient K taken as K/2, the basic correction θ1=θ1+KX is computed. In the example in FIG. 5, when the number n is nine, the polarity of the acceleration difference changes from "+" to "−". As a result, when the number n is nine, the operation proceeds to step ST35 from step ST33. In step ST35, the basic correction θ1=θ1−KX is computed, with the coefficient K taken as K/2. Since the coefficient K is set to one, the basic correction θ1 actually becomes 180°−11.25°=168.75°, which means that the basic correction θ1 is reduced (refer to the waveform of the basic correction θ1 in FIG. 5). Whenever there is a change in the polarity of the acceleration difference, a value of KX is halved. The value of KX becomes 11.25 due to the first polarity change. Thus, the operation proceeds to step ST37 from step ST36. In step ST37, the offset amount Δθ is changed to 45°. In other words, the offset amount Δθ of the offset θOFS determined by the offset determining section 41 is changed from 30° to 45°. Then, the operation returns to step ST17 via steps ST38 and ST40. When the number n becomes 10, the offset amount Δθ is 45°. Thus, the magnetic pole position correction θc when the number n is ten is computed by θc=θ1+Δθ=168.75°±45°=213.75°.

In this embodiment, the polarities of the immediately preceding acceleration difference and the current acceleration difference become "−" and "−" until the number n becomes 13. For this reason, the operation proceeds to step ST32 from step ST31. Then, in step ST32, computation of the basic correction θ1=θ1−KX is performed. As a result, in a process where the number n increases from 10 to 13, the basic correction θ1 is decremented by 11.25°. When the number n becomes 13 and the polarity of the acceleration difference then changes from "−" to "+", the operation proceeds to step ST34 from step ST33. Then, the value of the coefficient K is halved to K/2, and the basic correction θ1 is computed by the expression of θ1=θ1+KX. Accordingly, after the number n becomes 13, the basic correction θ1 will increase again. Since the value of KX when the number n is 13 is still larger than the predetermined value B, the operation returns to step ST17 via steps ST38 and ST40.

In this embodiment, the polarities of the immediately preceding acceleration difference and the current acceleration difference become "+" and "+" until the number n becomes 17. For this reason, the operation proceeds to step ST30 from step ST29, and computation of the basic correction θ1=θ1+KX is performed in step ST30. As a result, in a process where the number n increases to 17 from 13, each time the number n is incremented by one, the basic correction θ1 is incremented by 5.625°. When the number n becomes 17 and the polarity of the acceleration difference then changes from "+" to "−", the operation proceeds to step ST35 from step ST33.

Then, the value of the coefficient K is further halved, and the basic correction θ1 is computed by the expression of θ1=θ1−KX. Accordingly, after the number n becomes 17, the basic correction θ1 will decrease again. Since the value of KX when the number n is 17 is still larger than the predetermined value B, the operation returns to step ST17 via steps ST38 and ST40.

As described above, the basic correction θ1 converges to the finally-determined basic correction while repeatedly increasing and decreasing. Whenever the polarity of the current acceleration difference changes from the polarity of the immediately preceding acceleration difference, the value of KX is halved. Then, when it is determined that the value of KX becomes smaller than the predetermined value B in step ST38, the operation proceeds to step ST39. In step ST39, the first switching section SW1 selects a contact C3, and the second switching section SW2 is turned off. When the first switching section SW1 selects the contact C3, the basic correction θ1 which has converted at that point is stored in the storage section 43 as the finally-determined magnetic pole position correction θc. In an operation after the storage, the basic correction θ1 stored in the storage section 43 is output from the storage section 43 as the finally-determined magnetic pole position correction θc. Accordingly, after the storage, using a magnetic pole position obtained by adding the finally-determined basic correction θ1 (which is the finally-determined magnetic pole position correction θc) stored in the storage section 43 to the relative magnetic pole position θm obtained from the encoder 3 as a reference, the current control device 10 determines the phase of the three-phase current.

The polarity change determining section 37 is implemented by steps ST29, ST31, and ST33 shown in the flowchart in FIG. 4. The offset determining section 41 is implemented by steps ST17 to ST19 and steps ST36 and ST37. The basic correction adjusting section 39 is implemented by most of steps other than the above steps. The first switching section SW1 and the second switching section SW2 are implemented by steps ST1, ST14, and ST39. Switching operations of the first switching section SW1 and the second switching section SW2 are performed, based on a command from a switching command generating section, not shown, provided inside the regular correction generating section 32.

In the embodiment described above, a rotary type synchronous motor is employed as the synchronous motor 1. The present invention may be of course applied to a linear motor as well.

While the preferred embodiments of the invention have been described with a certain degree of particularity with reference to the drawings, obvious modifications and variations are possible in light of the above teachings. It is therefore to be understood that within the scope of the appended claims, the invention may be practiced other than as specifically described.

What is claimed is:

1. A control system for a synchronous electric motor which includes a stator and a moving element, the stator including a plurality of stator magnetic poles each polarized when a current is flown through armature winding, the moving element including a plurality of moving element magnetic poles, the control system comprising:

a position detecting section for detecting a relative magnetic pole position θm of the moving element magnetic pole relative to the stator magnetic pole, and outputting a relative position detection signal indicating the relative magnetic pole position θm;

a torque command generating section for generating a torque command;

a current command generating section for generating a current command that determines a current to be flown through the armature winding based on the torque command;

a current control device that supplies the current to the armature winding based on the current command;

a current feedback section for detecting the current flowing through the armature winding, and generating a feedback current signal indicating the current;

the current feedback section and the current control device being configured to determine a phase of the current, based on the relative magnetic pole position θm detected by the position detecting section;

an acceleration computing section for computing an acceleration of the moving element based on the relative magnetic pole position θm output from the position detecting section;

an added torque generating section for generating an added torque TADD to be added to the torque command and necessary for allowing the moving element to overcome friction toque and thereby move;

an initial correction generating section for generating, during an initial operation, a magnetic pole position correction θc to be added to the relative magnetic pole position θm so as to shift the phase of the current substantially to a phase where the maximum torque may be obtained, when an absolute value of the acceleration is smaller than a predetermined reference value; and a regular correction generating section for generating, during a regular operation, the magnetic pole position correction θc to be added to the relative magnetic pole position θm so as to shift the phase of the current substantially to the phase where the maximum torque may be obtained, when the absolute value of the acceleration is equal to or larger than the predetermined value;

the initial correction generating section being configured to generate the magnetic pole position correction θc during the initial operation by adding 90° to and/or subtracting 90° from an initial value of a basic correction θ1;

the regular correction generating section including:

a basic correction determining section for determining the basic correction θ1 that is the basis of the magnetic pole position correction θc during the regular operation; and an offset determining section for determining an offset θOFS to be alternately added to or subtracted from the basic correction θ1;

the basic correction determining section including:

a basic correction adjusting section for increasing or decreasing the basic correction θ1 whenever the acceleration is detected;

an acceleration difference computing section for computing an acceleration difference between the acceleration previously detected and the acceleration currently detected; and a polarity change determining section for determining a change in polarity for the acceleration difference computed by the acceleration difference computing section;

the basic correction adjusting section being configured to: perform an incremental operation of incrementing the basic correction θ1 by a predetermined correction increment/decrement KX or a decremental operation of decrementing the basic correction θ1 by a predetermined correction increment/ decrement KX according to the polarity for the acceleration difference before the polarity change determining section determines the change in polarity; stepwisely decrease the correction increment/decrement KX and switch between the incremental operation and the decremental operation whenever the polarity change determining section determines the change in polarity for the acceleration difference; and stop the incremental operation or the decremental operation when the correction increment/decrement KX drops below a predetermined lower limit B, and set the basic correction θ1 at this point as a finally-determined magnetic pole position correction θc.

2. The control system for a synchronous electric motor according to claim 1, wherein
the added torque generating section generates the added torque which gradually increases when the absolute value of the acceleration is smaller than the reference value, and generates the added torque which is equal to or more than the added torque, which has been generated before the absolute value of the acceleration reaches the reference value, once the absolute value of the acceleration has reached the reference value.

3. The control system for a synchronous electric motor according to claim 1, wherein
the initial correction generating section alternately generates a magnetic pole position correction that shifts the moving element to a positive side and a magnetic pole position correction that shifts the moving element to a negative side, as the magnetic position correction to be added to the relative magnetic pole position during the initial operation.

4. The control system for a synchronous electric motor according to claim 1, wherein
the offset determining section increases an offset amount Δθ of the offset θOFS when the correction increment/decrement KX becomes smaller than a predetermined value.

5. The control system for a synchronous electric motor according to claim 4, wherein
the offset determining section increases the offset amount Δθ1.5 times the offset amount Δθ initially defined when the correction increment/decrement KX becomes smaller than the predetermined value.

6. The control system for a synchronous electric motor according to claim 1, wherein
the basic correction adjusting section decreases the correction increment/decrement by a factor of 1/n (where n is a positive integer of two or more) whenever the polarity change determining section determines a change in polarity.

7. The control system for a synchronous electric motor according to claim 1, wherein
the current feedback section and the current control device determine a phase of the current, based on a value obtained by adding the finally-determined magnetic pole position correction θc to the relative magnetic pole position θm output from the position detecting section.

* * * * *